United States Patent [19]
Leboisne et al.

[11] Patent Number: 6,089,119
[45] Date of Patent: Jul. 18, 2000

[54] MOTOR VEHICLE PEDAL ARRANGEMENT

[75] Inventors: Cedric Leboisne, La Courneuve; Frederic Antherieu, Fontenay-Sous-Bois, both of France

[73] Assignee: Bosch Systemes de Freinage, Drancy, France

[21] Appl. No.: 09/051,188

[22] PCT Filed: Mar. 23, 1998

[86] PCT No.: PCT/FR98/00573

§ 371 Date: Apr. 1, 1998

§ 102(e) Date: Apr. 1, 1998

[87] PCT Pub. No.: WO98/49030

PCT Pub. Date: Nov. 5, 1998

[51] Int. Cl.⁷ .............................. G05G 1/14; B60K 28/14
[52] U.S. Cl. .............................. 74/512; 74/560; 280/784; 296/189; 180/274
[58] Field of Search .................... 74/512, 560; 180/274, 180/275; 280/750, 752, 784; 296/189

[56] References Cited

U.S. PATENT DOCUMENTS

| | | | |
|---|---|---|---|
| 5,615,749 | 4/1997 | Kato | 180/274 |
| 5,778,732 | 7/1998 | Patzelt et al. | 74/512 |
| 5,848,558 | 12/1998 | Isono et al. | 180/274 |
| 5,848,662 | 12/1998 | Sakaue | 180/274 |
| 5,921,144 | 7/1999 | Williams, Jr. et al. | 74/512 |
| 6,006,626 | 12/1999 | Notake et al. | 74/512 |

FOREIGN PATENT DOCUMENTS

| | | |
|---|---|---|
| 3904616 | 8/1989 | Germany . |
| 4409235 | 10/1994 | Germany . |
| 4409285 | 10/1994 | Germany . |
| 4409324 | 10/1994 | Germany . |
| 2031814 | 4/1980 | United Kingdom . |

*Primary Examiner*—David A. Bucci
*Assistant Examiner*—Chong H. Kim
*Attorney, Agent, or Firm*—Leo H. McCormick, Jr.; Warren Comstock

[57] ABSTRACT

A pedal arrangement for a motor vehicle having a bulkhead (10) which forms a barrier between an engine compartment (C) and a passenger compartment (H) for a driver and passengers. The pedal arrangement includes a transverse brace (32) which is rigid in bending, a mount (12) for a pedal (14) which is secured to the bulkhead (10) on the passenger compartment (H) side of the bulkhead (10) and at least one rigid force-transmission element (30). The pedal (14) has a lever (16) with a first end articulated to the pedal mount (12) and a second end with an operating shoe (18) attached thereto. The force-transmission element (30) has a first end (28) articulated to the transverse brace (32) and a second end (34) which extends between the pedal mount (12 and lever (16). The lever (16) has a stop (40) which interacts with the lever of pedal (14) to move the lever (16) away from a fixed point (38) of the pedal mount (12) and bring the lever closer to the bulkhead (10) when the bulkhead (10) is urged toward the passenger compartment (H) as a result of a frontal impact to the vehicle.

3 Claims, 1 Drawing Sheet

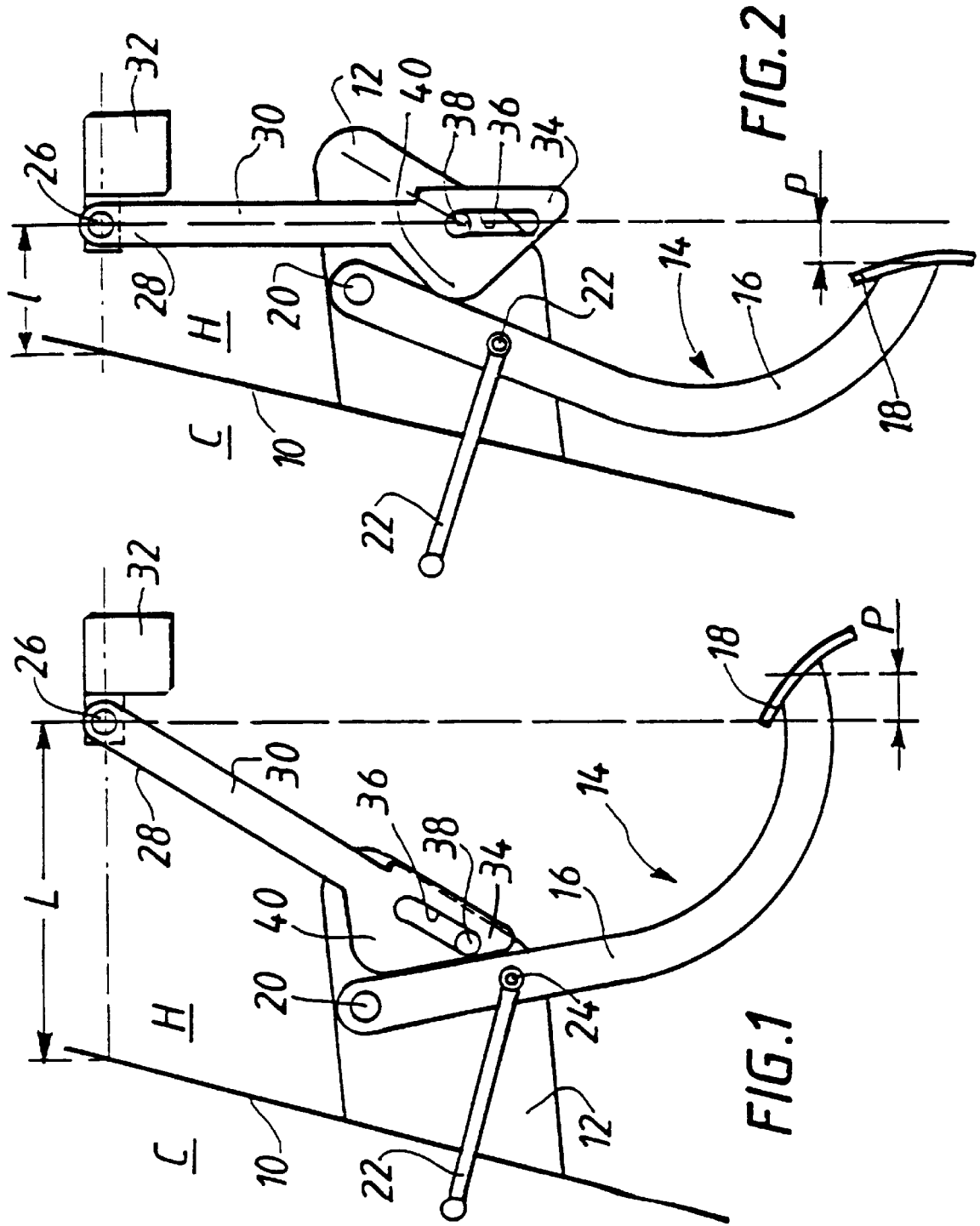

MOTOR VEHICLE PEDAL ARRANGEMENT

The present invention relates to pedal arrangements for motor vehicles in general, these pedals being intended to control various members such as the inlet of fuel gases to the combustion chamber of a combustion engine, a pneumatic brake booster or a device for engaging/disengaging the clutch.

BACKGROUND OF THE INVENTION

The tightening of safety standards that has been going on for some years now in the field of motor vehicles has made it necessary to develop passive safety devices intended to avoid or reduce the consequences of an accident on the driver and passengers of this vehicle. As regards in particular the driver of the vehicle, these devices need to be such that a frontal or oblique impact experienced by the vehicle is not passed on to the driver's ankle or leg, even if the driver is, for example, depressing the brake pedal as hard as he can.

Many devices have been developed to solve this problem. Documents DE-A-4,340,633 or DE-A-4,409,324 for example, disclose devices in which a cable pulls the pedal lever upwards so as to dislocate this lever from its support and move it out of the normal space occupied by the feet of the driver of the vehicle.

The drawback of such a set-up is that if the driver of the vehicle is depressing this pedal as hard as he can, his foot will then itself be pulled upwards, it then being possible for the driver's leg to sustain other damage, particularly to the tibia between the ankle and the knee.

Also disclosed, for example in documents DE-A-4,409,235 or DE-A-4,409,285, are devices in which the spindle providing articulation between the pedal and its mount is pulled out by a linkage system, thus releasing the mechanical connection between the pedal and the bulkhead. The drawback of such a set-up is the relative complexity of the linkage required, and a risk of poor operation if at that time the driver is depressing this pedal as hard as he can.

SUMMARY OF THE INVENTION

The present invention falls within this context and its purpose is to provide a new pedal arrangement which avoids any transmission to the driver's leg or foot of a frontal or oblique impact experienced by the vehicle, in a reliable way employing only simple and inexpensive means.

To this end, the invention provides a pedal arrangement for a motor vehicle, the vehicle comprising a bulkhead forming a barrier between an engine compartment and a passenger compartment for the driver and the passengers, a transverse brace which is more or less rigid in bending, a mount for a pedal secured to the bulkhead on the passenger compartment side, the pedal comprising a pedal lever articulated by one of its ends to the pedal mount and at its other end comprising an operating shoe, at least one rigid force-transmission element being articulated by a first of its ends to the transverse brace.

According to the present invention, the second end of the rigid force-transmission element extends between the pedal mount and the lever of the pedal and comprises a stop interacting directly with the lever of the pedal to move it away from a fixed point of the pedal mount and bring it closer to the bulkhead when the bulkhead is urged backwards as a result of a frontal impact to the vehicle.

Thanks to this arrangement, the stop on the force-transmission element acts like a wedge forcibly inserted between the lever of the pedal and the fixed point of the pedal mount in order to move the lever and the shoe out of the volume of the passenger compartment in which the feet or legs of the driver of the vehicle are normally located.

In one possible embodiment of the invention, the second end of the rigid force-transmission element is formed with an oblong slot capable of interacting with the fixed point of the mount for the pedal.

For example, the fixed point of the pedal mount may consist of a stud secured to the pedal mount.

In an advantageous set-up, the fixed point determines the position at rest of the pedal.

Other objects, features and advantages of the invention will emerge clearly from the description thereof given hereinafter by way of non-limiting indication with reference to the attached drawings.

BRIEF DESCRIPTION OF THE DRAWINGS

FIG. 1 is a sectional view of a pedal arrangement in accordance with the present invention, in the normal position of use, and FIG. 2 is a sectional view through the pedal arrangement of FIG. 1, after the vehicle has suffered a frontal or oblique impact.

DETAILED DESCRIPTION OF THE INVENTION

Depicted in the figures is a vehicle bulkhead 10 separating an engine compartment C from a passenger compartment H for the driver and the passengers of the vehicle. A pedal mount 12 is fixed in the conventional way to the bulkhead 10 and protrudes into the passenger compartment H. A pedal, denoted overall by the reference 14, consists of a lever 16 one end of which comprises a shoe 18 intended to be actuated by the foot of the driver of the vehicle, and the other end of which is articulated to the mount 12 via a pivot 20.

The pedal 14 is intended to control the operation of one of the devices with which the vehicle is equipped, such as a pneumatic brake booster or hydraulic clutch emitter, for example. For this, the lever 16 is articulated to an operating rod 22 via a pivot 24.

This being the case, it will be clearly understood that if the vehicle experiences a frontal or oblique impact of such a force that it can push the bulkhead 10 back into the passenger compartment H, the bulkhead 10 will move the pedal 14 back into the passenger compartment H, it then being possible for the shoe 18 to injure the ankle or leg of the driver of the vehicle.

In accordance with the present invention, such an eventuality may be avoided. To this end, provision is made to articulate, via a pivot 26, one end 28 of a rigid force-transmission element 30 or push rod to a transverse brace 32 which is more or less rigid in bending consisting, for example, of a U section and situated, for example, at the base of the windscreen of most vehicles, used especially for attaching the vehicle dashboard.

The other end 34 of the push rod 30 is formed with an oblong slot 36 in which a stud 38 secured to the pedal mount 12 is received. The end 34 of the push rod 30 also comprises a part 40 forming a stop or a cam surface for the lever 16.

In normal operation, the lever 16 under the urging of various springs (not depicted) is in the position of rest close to the stop 40. The driver of the vehicle can therefore actuate the device connected to the operating rod 22 by depressing the shoe 18 with his foot.

If the vehicle suffers a frontal or oblique impact of such a force that the bulkhead 10 is made to deform, such a deformation will, most of the time, cause the bulkhead to move back towards the passenger compartment, for example by a distance equal to (L–l) In this backwards movement, the push rod 30 is made to rotate about the pivot 26 by the stud 38 secured to the pedal mount 12 itself secured to the bulkhead 10, the oblong slot 36 sliding about the stud 38.

The part 40 of the push rod 30 forms a cam surface and acts like a wedge forcibly inserted between the stud 38 of the pedal mount 12 and the lever 16 of the pedal, to force this lever to pivot about its spindle 20, away from the stud 38 and towards the bulkhead 10.

It can thus clearly be seen that the lever 16 and the shoe 18 of the pedal 14 move closer to the bulkhead 10 and that they are thus brought into a withdrawn position in which there is no risk of them injuring the leg or ankle of the driver of the vehicle. It can even be seen that the centre of the shoe 18, which before the impact was situated a distance P back from the brace 32 has been brought after the impact to a distance p forward of this same brace 32, assumed to be indeformable in bending. The shoe 18 has therefore moved forward by a distance (P+p) with respect to the brace 32, and therefore with respect to the driver, who is held in his seat by a seat-belt.

It can also be seen that the rotation of the lever 16 of the pedal 14 has resulted in the device connected to the operating rod 22 being actuated automatically. This then means that even if the driver of the vehicle was pressing as hard as he could on the shoe 18 at the moment immediately before the impact, he will not receive any impact through the shoe 18, but in contrast will feel the shoe 18 drop away under his foot.

Of course, the present invention is not restricted to the embodiment described, but can on the contrary be varied in a great many ways which will be obvious to those skilled in the art. Thus for example that end of the push rod or of the force-transmission element which interacts with the of the pedal, and likewise the shape of the oblong slot could be configured in any appropriate way to make the lever move more or less progressively out of the volume of the passenger compartment where the feet or legs of the driver of the vehicle are normally situated. Likewise, provision could be made for the oblong slot to be formed in the pedal mount, the push rod being formed with a stud that slides in this oblong slot.

We claim:

1. A pedal arrangement for a motor vehicle having a bulkhead forming a barrier between an engine compartment and a passenger compartment for a driver and any passengers, said pedal arrangement comprising:

a transverse brace adapted to be fixed to said vehicle;

a mount for a pedal which is adapted to be secured to said bulkhead on said passenger compartment of said bulkhead, said pedal comprising a pedal lever articulated by a first end on said pedal mount and a second end having an operating shoe; and at least one rigid force-transmitting element being articulated by a first end to said transverse brace, said rigid force-transmitting element being characterized by a second end which extends between said mount and said pedal lever, said second end having an oblong slot capable of interacting with a fixed point defined by a stud secured to said mount for said pedal, said second end having a stop which directly interacts on said pedal lever to move said pedal lever away from a fixed point of said mount and bring said pedal lever closer to said bulkhead when said bulkhead is urged toward said passenger compartment as a result of a frontal impact to said vehicle.

2. The pedal arrangement as recited in claim 1 characterized in that said fixed point determines a rest position for said pedal.

3. The pedal arrangement as recited in claim 1 characterized in that said fixed point is a cam which determines a rest position for said pedal.

* * * * *